US009672132B2

(12) United States Patent
Hsu et al.

(10) Patent No.: US 9,672,132 B2
(45) Date of Patent: Jun. 6, 2017

(54) METHODS AND APPARATUS FOR MEASURING PERFORMANCE OF A MULTI-THREAD PROCESSOR

(75) Inventors: Liangchi Hsu, San Diego, CA (US); Vijay Kumar Kadagala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 12/780,588

(22) Filed: May 14, 2010

(65) Prior Publication Data
US 2011/0119682 A1 May 19, 2011

Related U.S. Application Data

(60) Provisional application No. 61/262,704, filed on Nov. 19, 2009.

(51) Int. Cl.
*G06F 11/34* (2006.01)
(52) U.S. Cl.
CPC ...... *G06F 11/3423* (2013.01); *G06F 11/3433* (2013.01)
(58) Field of Classification Search
USPC .......................................................... 718/107
See application file for complete search history.

(56) References Cited

U.S. PATENT DOCUMENTS

| | | | |
|---|---|---|---|
| 5,499,349 A * | 3/1996 | Nikhil et al. ............... | 712/26 |
| 5,872,913 A | 2/1999 | Berry et al. | |
| 6,018,759 A * | 1/2000 | Doing et al. ............... | 718/108 |
| 7,421,592 B1 | 9/2008 | Kadatch et al. | |
| 7,426,732 B2 * | 9/2008 | Alverson et al. ........... | 718/108 |
| 8,180,724 B1 * | 5/2012 | Qureshi et al. ............. | 706/50 |
| 2005/0188364 A1 * | 8/2005 | Cockx et al. ............... | 717/159 |
| 2005/0198635 A1 | 9/2005 | Olszewski et al. | |
| 2007/0061521 A1 | 3/2007 | Kelly et al. | |
| 2007/0288728 A1 | 12/2007 | Tene et al. | |
| 2007/0294696 A1 * | 12/2007 | Papakipos et al. .......... | 718/102 |

(Continued)

FOREIGN PATENT DOCUMENTS

CN 1193144 A 9/1998
JP H0462644 A 2/1992
(Continued)

OTHER PUBLICATIONS

International Search Report and Written Opinion—PCT/US2010/057089—ISA/EPO—Jun. 8, 2011.
Taiwan Search Report—TW099139822—TIPO—May 21, 2013.

*Primary Examiner* — Thomas L Mansfield, Jr.
(74) *Attorney, Agent, or Firm* — Howard Seo

(57) ABSTRACT

Disclosed are methods and apparatus for measuring performance of a multi-thread processor. The method and apparatus determine loading of a multi-thread processor through execution of an idle task in individual threads of the multi-thread processor during predetermined time periods. The idle task is configured to loop and run when no other task is running on the threads. Loop executions of the idle task on each thread are counted over each of the predetermined time periods. From these counts, loading of each of the threads of the multi-thread processor may then be determined. The loading may be used to develop a processor profile that may then be displayed in real-time.

28 Claims, 6 Drawing Sheets

(56) References Cited

U.S. PATENT DOCUMENTS

2008/0195851 A1\* 8/2008 Hoogerbrugge .............. 712/241
2009/0150898 A1\* 6/2009 Sohn et al. .................. 718/105
2010/0223598 A1\* 9/2010 Levine et al. ................ 717/128

FOREIGN PATENT DOCUMENTS

| JP | H076062 A | 1/1995 |
| JP | H11327927 A | 11/1999 |
| JP | 2003241978 A | 8/2003 |
| JP | 2006524380 A | 10/2006 |
| TW | 200802098 A | 1/2008 |
| TW | 200841239 A | 10/2008 |
| WO | 2004095282 A1 | 11/2004 |

\* cited by examiner

METHODS AND APPARATUS FOR MEASURING PERFORMANCE OF A MULTI-THREAD PROCESSOR

CLAIM OF PRIORITY UNDER 35 U.S.C. §119

The present application for patent claims priority to Provisional Application No. 61/262,704 entitled "METHODS AND APPARATUS FOR PERFORMANCE PROFILING OF A MULTI-THREAD PROCESSOR" filed Nov. 19, 2009, and assigned to the assignee hereof and hereby expressly incorporated by reference herein.

BACKGROUND

Field

The present disclosure relates generally to methods and apparatus for measuring performance of a multi-thread processor, and more specifically to methods and apparatus for loading measuring and performance profiling of multi-thread processors in devices such as wireless devices on a per thread basis and for various uses and data rates.

Background

In devices such as wireless devices, profiling the performance of a processor that the wireless communication is running on is important. The profiling and measurement of processor performance can provide insight for design optimization, as well as provide a convenient tool for design debugging. The result of such profiling can be used for resource management in a device utilizing the processor, such as a wireless device in one example. Such resource management can be dynamic and flexible if the profiling is performed in a real-time manner. One example is a communication flow control based processor loading that is measured based on performance profiling.

As the wireless technology evolves, many sophisticated mobile features and high data rates are required to be implemented in a wireless devices or handheld devices. The processor technology of the wireless devices, consequently, evolves too. For example, for 2G cellular technologies such as GSM/GPRS, a typical processor is based on single thread architecture, while for 3G/4G cellular technologies such as HSPA+/LTE/EV-DO, processors have evolved to be multi-thread based.

No scheme or apparatus available in the known art, however, measures multi-thread processor CPU loading under various use cases and data rates. Furthermore, there is no known tool or instrument available to probe the multi-thread processor CPU usage, per each thread, when a packet data session is ongoing in a device, such as a wireless device. Moreover, there is no known tool or instrument available to probe the multi-thread processor "all-wait" (i.e. all processor threads are idle) status when a packet data session is ongoing in a wireless device. Accordingly, a need exists for determining loading of a multi-thread processor and profiling performance of the processor using the determined loading.

SUMMARY

In an aspect, a method for determining loading of a multi-thread processor is disclosed. The method includes executing at least one idle task in at least one thread of the multi-thread processor during at least one predetermined time period. The idle task is configured to loop and run when no other task is running on the at least one thread. At least one count of loop executions of the at least one idle task over the at least one predetermined time period is determined. Finally, the method includes determining loading of at least the at least one thread of the multi-thread processor based on the at least one count of the number of loop executions.

In another aspect, an apparatus for determining the loading of a multi-thread processor is disclosed. The apparatus includes at least one processor configured to execute at least one idle task in at least one thread of the multi-thread processor during at least one predetermined time period, wherein the idle task is configured to loop and run when no other task is running on the at least one thread. The processor is also configured to determine at least one count of loop executions of the at least one idle task over the at least one predetermined time period. Finally, the processor is configured to determine loading of at least the at least one thread of the multi-thread processor based on the at least one count of the number of loop executions.

According to still another aspect, an apparatus for determining loading of a multi-thread processor is disclosed. The apparatus includes means for executing at least one idle task in at least one thread of the multi-thread processor during at least one predetermined time period, wherein the idle task is configured to loop and run when no other task is running on the at least one thread. Means for determining at least one count of loop executions of the at least one idle task over the at least one predetermined time period are further included. Also, the apparatus includes means for determining loading of at least the at least one thread of the multi-thread processor based on the at least one count of the number of loop executions.

According to still one more aspect, a computer program product comprising computer-readable medium is disclosed. The medium comprises code for causing a computer to generate a performance profile of a multi-thread processor wherein the code includes code for causing a computer to execute at least one idle task in at least one thread of the multi-thread processor during at least one predetermined time period. The idle task is configured to loop and run when no other task is running on the at least one thread. Further included is code for causing a computer to determine at least one count of loop executions of the at least one idle task over the at least one predetermined time period, and code for causing a computer to determine loading of at least the at least one thread of the multi-thread processor based on the at least one count of the number of loop executions.

DETAILED DESCRIPTION

The present disclosure features methods and apparatus that afford measurement and/or profiling of the performance of a multi-thread processor CPU, such as those used in devices for 3G/4G technologies, such as High Speed Packet Access (HSPA), evolved HSPA (HSPA+), Long Term Evolution (LTE), and EV-DO technologies. Additionally, the presently disclosed method and apparatus afford real-time profiling and/or measurement that can be displayed in real-time for use in designing or optimizing multi-thread CPU usage or operation.

The apparatus and methods described herein are applicable to various devices that utilize multi-thread processors. In a particular aspect, the present apparatus and methods may be applied to wireless devices utilizing multi-thread processors to help optimizing the processor operation in the wireless device. It is noted that exemplary wireless communication technologies that such devices may implement include Code Division Multiple Access (CDMA), Time Division Multiple Access (TDMA) networks, Frequency Division Multiple Access (FDMA), Orthogonal FDMA (OFDMA), Single-Carrier FDMA (SC-FDMA), High Speed Packet Access (HSPA and HSPA+) technologies, Long Term Evolution (LTE), EV-DO technologies, etc. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Ultra Mobile Bandwidth (UMB), Evolved UTRA (E-UTRA), IEEE 802.11, IEEE 802.16 (WiMax), IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Also, the term "processor" as used herein may include, but is not limited to, a CPU, ASIC, digital signal processor (DSP), or any other type of processor capable of executing instructions. Additionally, although the present disclosure relates primarily to multi-thread processors, it will be evident to one skilled in art that the present apparatus and methods apply to any processor running processes in parallel, concurrently, etc, or even potentially to multi-tasking. Furthermore, although the present disclosure is discussed in the context of processors used in wireless devices, one skilled in the art will appreciate that the present methods and apparatus may be broadly applied to any multi-thread processor regardless of the application or use.

Figure 1:
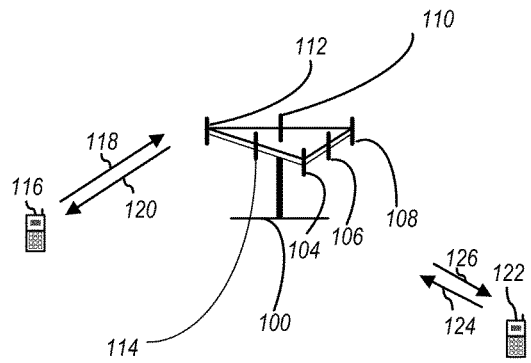
FIG. 1 illustrates an example of a multiple access wireless communication system.

Referring to FIG. 1, an example of a multiple access wireless communication system in which the present methods and apparatus may be employed is shown. An access point 100 (AP) (or eNodeB or base station) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) (or mobile device or user equipment (UE)) is in communication with antennas 112 and 114, where antennas 112 and 114 transmit information to access terminal 116 over a downlink (DL) or forward link 120 and receive information from access terminal 116 over an uplink (UL) or reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, DL 120 may use a different frequency then that used by UL 118. In a TDD system, a single frequency is used for both UL 118 and DL 120, with time multiplexing of UL and DL signals.

Each group of antennas and/or the area in which they are designed to communicate is often referred to as a sector of the access point. In an aspect, antenna groups each are designed to communicate to access terminals in a sector of the areas covered by access point 100.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
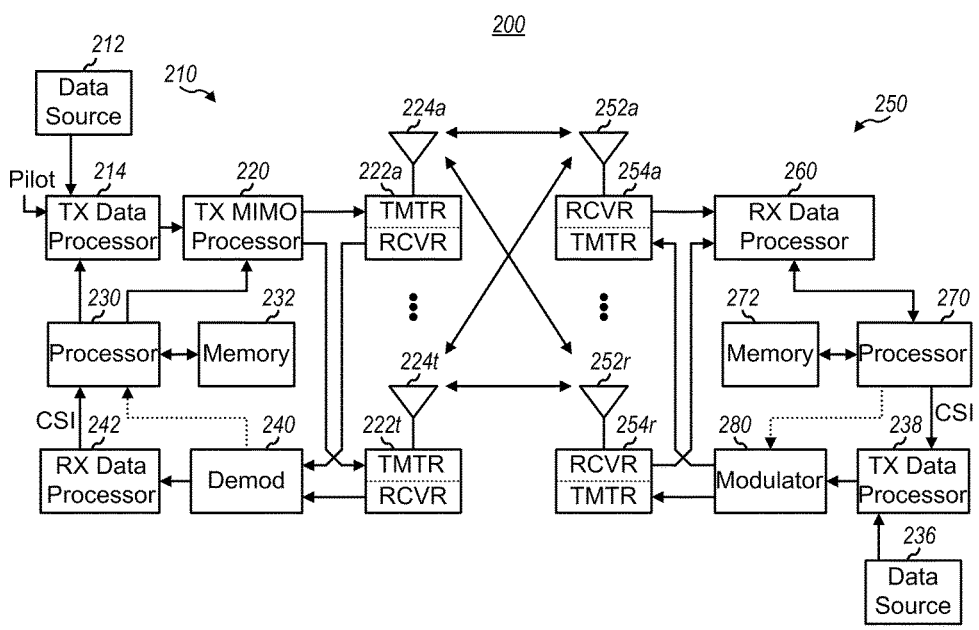
FIG. 2 is a block diagram of an exemplary communication system that may employ or utilize the presently disclosed methods and apparatus.

FIG. 2 is a block diagram of an example of a transmitter system 210 (also known as the access point) and a receiver system 250 (also known as access terminal) in a MIMO system 200 that provides spatial diversity multiplexing. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The reverse link or UL message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link or UL message transmitted by the receiver system 250. Processor 230 then determines which precoding matrix to use for determining the beamforming weights then processes the extracted message.

It is noted that the present disclosure affords apparatus and methods for profiling a processor such as processors 230 or 270 in wireless devices 210 and 250, but also could be applied to any multi-thread processor in any number of various apparatus, whether wireless devices or not.

Figure 3:
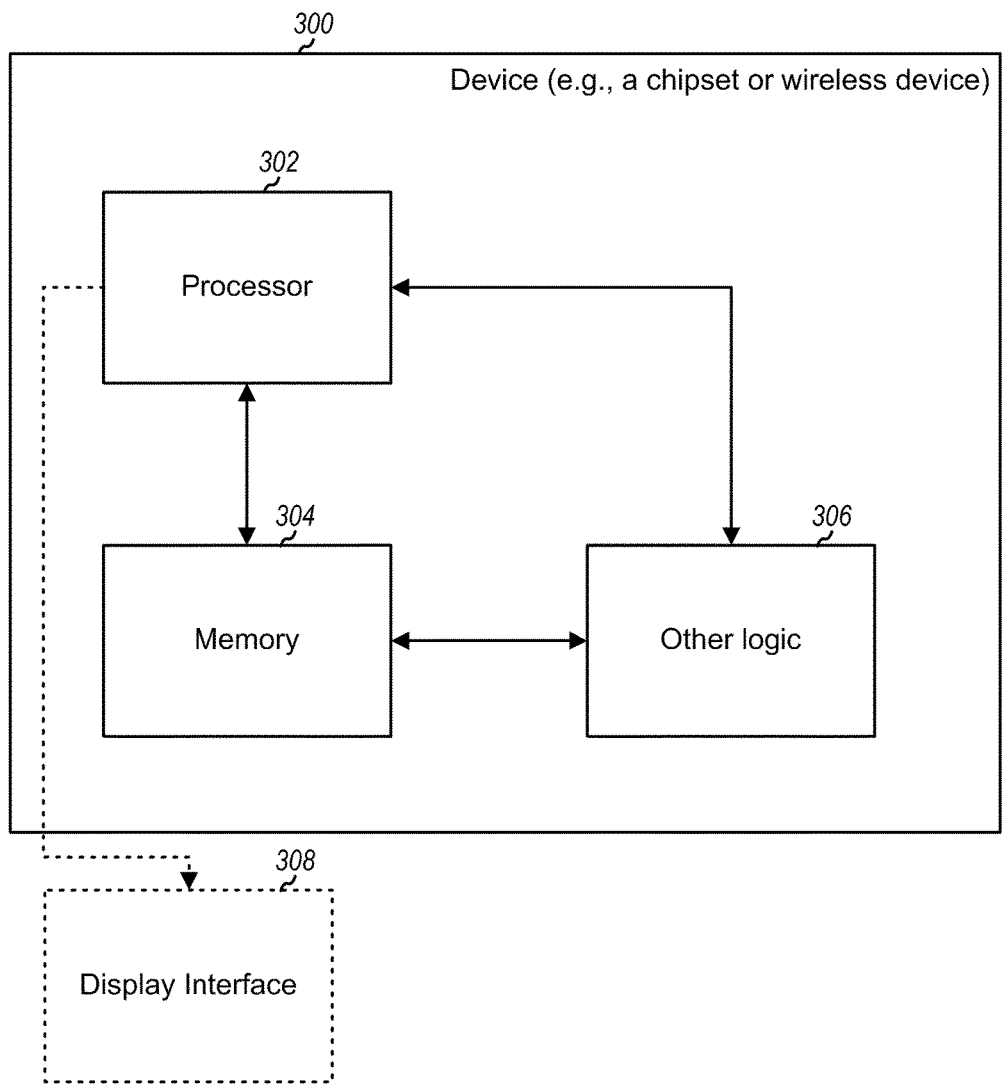
FIG. 3 illustrates a block diagram of a multi-thread processor profiling arrangement.

As one example of an implementation, FIG. 3 illustrates a block diagram of a multi-thread processor profiling arrangement. As illustrated, a device 300, which could be configured as either an integrated or chipset (e.g., a Mobile Station Modem™ (MSM™)) or considered more broadly as an entire device, may include a processor 302, which is a multi-thread processor. Along with processor 302 is a memory 304, which may be integral to the packaging of processor 302 or separate therefrom (or even separate from device 300). Additionally, other logic 306 may be included within device 300 (or external thereto) for providing additional profile or performance data such as determining CPU cycles where all threads of the processor 302 are idle, which will be discussed further below. Alternatively, the functions performed by logic 306, could be performed by the processor 302. Further, a display interface 308 may be included to display real-time profiling data.

Figure 4:
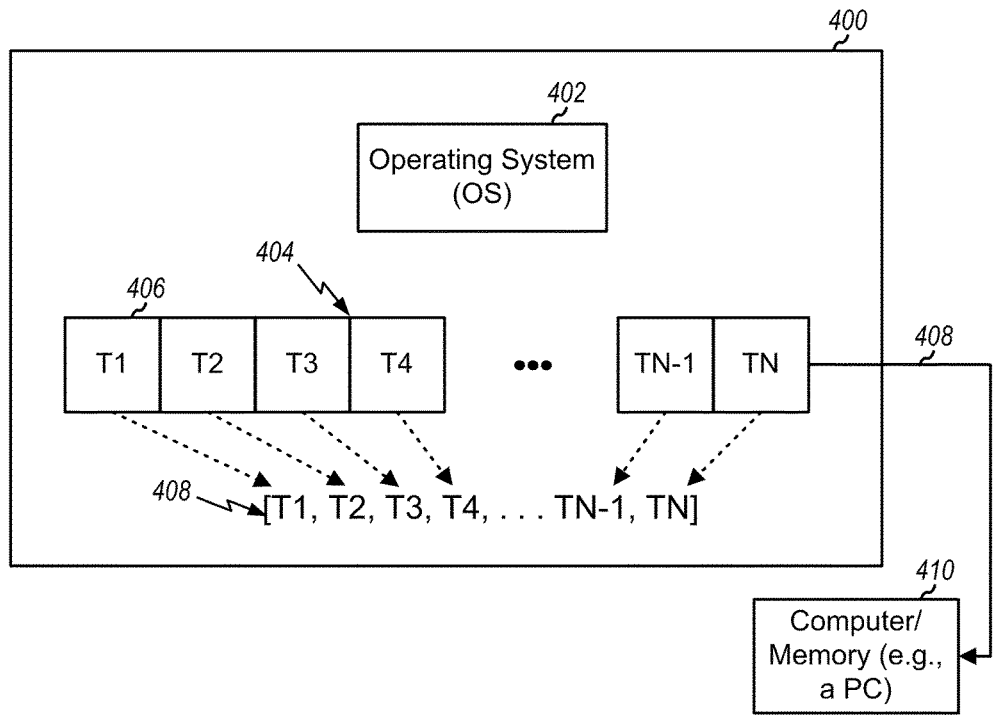
FIG. 4 is block diagram illustrating an apparatus operation for determining loading of a multi-thread processor.

FIG. 4 is block diagram illustrating an apparatus operation for determining loading of a multi-thread processor. This illustration shows a system 400, which is a representation of a multi-thread processing system operable in a device such as a wireless device, as merely one example. The system 400 executes operations including multi-threads based on some underlying operating system (OS) 402. The operating system and attendant software may be configured to execute an idle task on one or more of the threads in the multi-thread processing system. The idle task that is configured to be executed when no other task is being executed in a thread and may be an infinite loop or some other repeating operation. In an aspect, the idle task is simply a loop that performs nothing but a loop operation whose repetitions may be counted.

In an aspect, the system 400 may include a register 404 or equivalent device (or function in the case of software or firmware) used to store count of the loops of the idle task run in respective one or more of the threads. The register 404 includes separate count storage for each thread as illustrated by reference number 406 pointing out one of the count storages in register 404. Register 404 stores counts for each idle task run in each of an N number of threads (T1 through TN) over a predetermined time period (e.g., a T number of milliseconds (ms)). In an aspect, the register 404 includes a loop count of the executed idle task for each of the N number of independent threads. A vector, which is shown figuratively by vector 408, with N elements each having a loop count of idle task executions is then formed for each duration of the predetermined period (T ms). The vector is output via a communicative coupling 410 to a processing device, such as a computer and memory 412, to collate and process the count data for display to a user.

A vector 408 of [T1, T2, T3, . . . TN] of the N number of idle task count for each of N threads vectors is output every T ms such that a vector array of a number of T ms sampling periods may be formed. Accordingly, every T ms predetermined time period, the number of vectors is increased by one. The maximum number of the sleep vectors is a predetermined number M. After M*T ms, all idle task count vectors form an array with the size of M*N. The array is updated after M*T ms.

Figure 5:
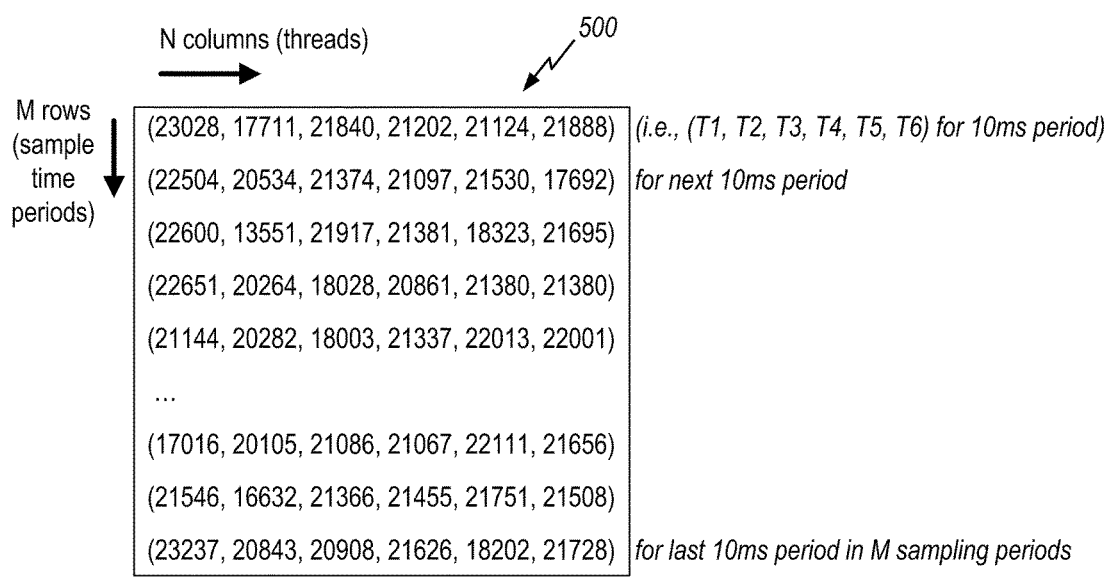
FIG. 5 illustrates an array of sleep vectors for accumulating counts for idle tasks run on multiple threads of a multi-thread processor.

FIG. 5 illustrates an exemplary array 500 of idle task count vectors for accumulating counts for idle tasks run on multiple threads of a multi-thread processor. For example, if the number of threads N=6, and the predetermined sampling period T=10 ms, and the number of total sampling periods M=1024, the sleeping array looks like a 1024*6 (i.e. M*N) array 500 as shown. It is noted that the example of FIG. 5 is merely illustrative, and that the values of M, N, and T may be set to any desired number.

Figure 6:
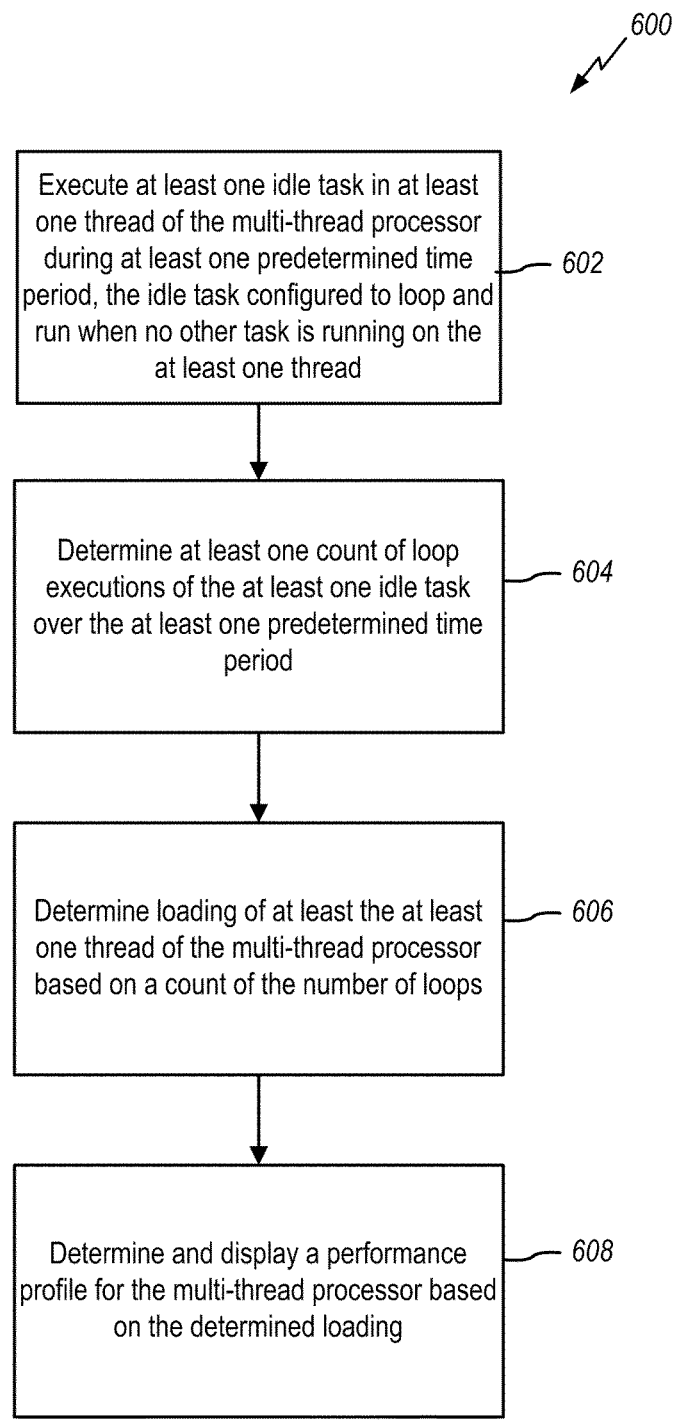
FIG. 6 is a method for effecting multi-thread processor profiling according to an aspect of the present disclosure.

FIG. 6 illustrates a method 600 for multi-thread processor profiling that may be utilized to profile performance of a multi-thread processor (e.g., processor 302). Method 600 includes first executing at least one idle task in at least one thread of the multi-thread processor during at least one predetermined time period, the idle task configured to loop and run when no other task is running on the at least one thread as shown in block 602. In a specific aspect, the processes of block 602 may include implementing a looping idle task in each independent thread of the multi-thread processor (e.g., 302) whenever the respective thread is idle (i.e. no other function or task is being executed on that thread).

Method 600 further includes determining at least one count of loop executions of the at least one idle task over the at least one predetermined time period as indicated by block 604. As discussed before, counting may be effected by a register 404 or similar unit or function. In a further aspect, the processes of executing the idle tasks and counting in block 602 are executed for an M number of predetermined time periods to form an M*N vector array as discussed previously. Thus, blocks 602 and 604 may include idle task execution and counting of the loop executions for multiple N vectors for N number of threads over M predetermined time periods to obtain the M*N array.

It will be also appreciated by those skilled in the art that the processes of blocks 602 and 604 are illustrated time sequentially in FIG. 6, the processes may be carried out simultaneously or repeatedly where a register is advancing the counts after the execution of each idle task loop until the end of the predetermined time period. After the time period expires, the register is reset to zero for counting loops of the idle task in the next predetermined time period and so forth until a count array of M time periods is derived.

After the process of block 604 is completed, such as after at least one predetermined time period, the loop count(s) may be used to determine a loading of the one or more independent threads of the multi-thread processor based on the count as illustrated by block 606. In an example, the count of the idle task loops provides a timing of how often a particular thread is idle since the idle task is configured to run only when no other tasks are being executed in the thread. Accordingly, if a maximum sleep count is known for a given thread over a given predetermined time period, then the loading for that time period can be determined based on the ratio of the idle task loop count during normal processor operation to the baseline maximum sleep count. This loading over multiple predetermined time periods (e.g., M time periods as discussed before) may be used to derive at least one aspect of a performance profile to know how much one or more threads in a multi-thread processor are loaded.

In one particular example of how to determine the loading in block 606 (although not explicitly illustrated in FIG. 6), the one or more threads of the multi-thread processor may be forced to be in the idle operation. The idle task may then be run in each thread of the multi-thread processor for at least the predetermined period of time and the number of loop executions of the idle task counted. In another particular example, the idle tasks may be run for a total of M predetermined time periods in order to gain enough counts to fill the M*N array discussed previously. The processor (or another processor apart from the multi-thread processor) may then find the maximum idle task count logged in the M*N array during the M periods where only the idle tasks have been run (termed herein as the maximum sleep scalar value or "MAX_SLEEP_SCALAR"). In effect, this value represents 100% CPU idle condition or sleep of any given thread.

The count values for each thread in each N vector may then be divided by the MAX_SLEEP_SCALAR value to derive an idle task or sleep profile, which is a percentage of idle tasks over a maximum idle task condition that represents loading of the particular threads. Alternatively, when the M*N array is determined, the total count of a particular thread over the M periods may be summed and divided by the MAX_SLEEP_SCALAR, which has be multiplied by M to obtain a loading for the particular thread. In any case, the determined loading may then be displayed in units of percentage, or any other suitable number (e.g., simply the fraction of the idle task or sleep count divided by the MAX_SLEEP_SCALAR) as indicated by the process in block 608. In a multi-thread processor, each idle task or sleep profile may be displayed per thread.

It is noted that the after the execution of all processes in method 600, the method 600 will continuously repeat to continue generation of profiling data over time. In one example, the predetermined time period may be 10 ms, with a total number of M periods equal to 25. Thus, the accumulation of data used for determining the sleep profile is performed each 250 ms (i.e., blocks 602 through 606), displayed (block 608), and then repeated and displayed every subsequent 250 ms period.

Figure 7:
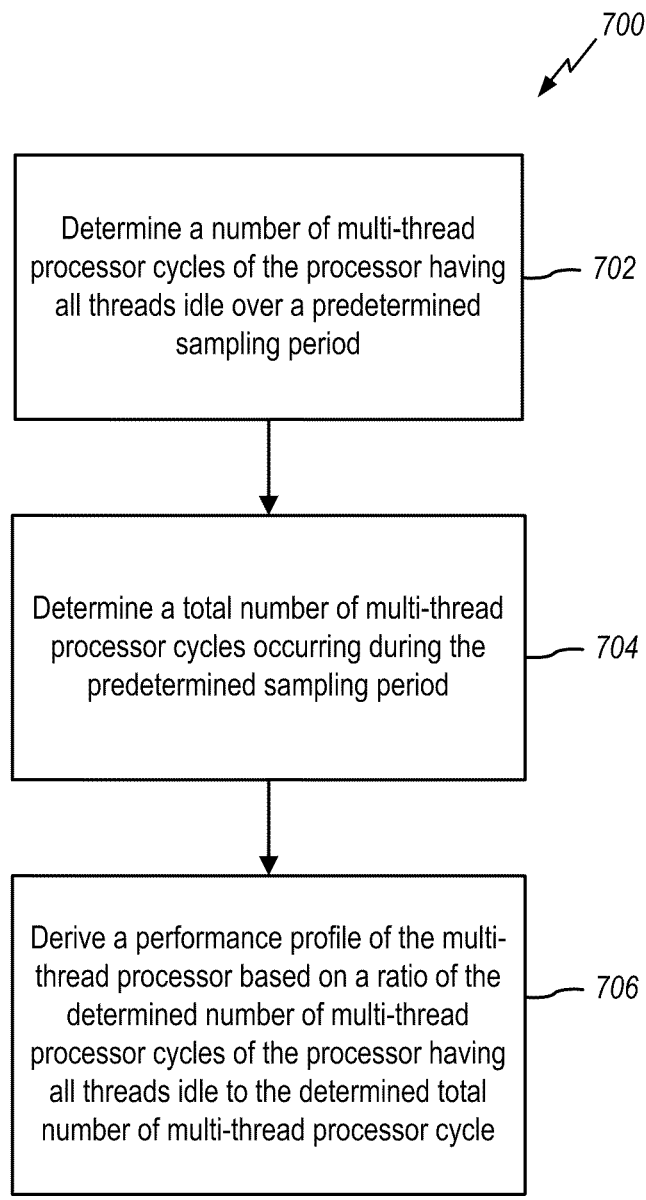
FIG. 7 is another method for effecting another multi-thread processor profiling according to an aspect of the present disclosure.

FIG. 7 illustrates another exemplary method 700 of determining another performance profile for a multi-thread processor. As shown, method 700 includes determining a number of multi-thread processor cycles of the processor having all threads idle over a predetermined sampling period (e.g., Y ms) as shown in block 702. It is noted that the term processor cycle denotes a CPU cycle of a processing unit. Further, the determination of which cycles have all threads idle may be implemented by a logic, such as logic 306 shown in FIG. 3, where an indication is output when all threads are idle. In an aspect, it is noted that this determination may rely upon the characteristic of multi-thread processor where the thread clock is idle when thread is not executing a task. Thus, the logic may be configured such that when all thread clocks are idle, the logic outputs a logic state indicating all threads are idle. In one example, the process of block 702 includes obtaining the number of multi-thread processor cycles that "all threads are waiting (idle)", termed herein as an "All_Wait_Cycle,"

Further, method 700 includes determining a total number of multi-thread processor cycles occurring during the predetermined sampling period (e.g., Y ms) as shown in block 704. In an aspect, this total number of cycles occurring in the sampling period may be referred to as the "Total_Cycle."

Also, method 700 includes deriving a performance profile of the multi-thread processor based on a ratio of the determined number of multi-thread processor cycles of the processor having all threads idle to the determined total number of multi-thread processor cycle as shown in block 706. This ratio, termed herein as the "all-wait ratio" or "all-wait percentage," is therefore derived with the quotient All_Wait_Cycle/Total_Cycle.

Similar to method 600, method 700 also includes the further process of causing display of the all-wait percentage information. It is noted that in an aspect methods 600 and 700 are useful together to obtain a more complete performance profiling record data set of a multi-thread processor by determining a loading profile of how much each thread is utilized as well as determining a profile concerning how frequently all threads are idle or waiting. Additionally, the disclosed apparatus and methods may generate and submit the profiling record data set every Y ms to a display function (e.g., function implemented by the processor (302)) to display profile information via a display interface (e.g., 308). The profiling record data set may consists of the idle count array (such as shown in FIG. 4) and the MAX_SLEEP_SCALER discussed above. The profiling record data set may also include the all-wait percentage during the sampling period Y ms. It is noted that in an aspect the predetermined sampling period Y ms may be equal to the total of M predetermined time periods in the count array. As an example of a profiling record data set that may be generated, Table 1 below gives a particular example of at least 3 items with Y=250 ms, N=6 (6 threads) with each predetermined time period equal to 10 ms, and M=25 (i.e., a total array time of 25×10 ms=250 ms).

TABLE 1

Profiling record data set

| Record item | Type | Description |
| --- | --- | --- |
| MAX_250ms_SLEEP_SCALER | UINT32 | Max idle sleep count for 250 ms period. Default = 20500 max count * 25 |
| 250 ms Sleep profiling raw data | UINT32 Array[6] | 6 Sleep profiling raw data for 250 ms period (for 6 threads). |
| All-Waits percentage (%) during 250 ms | UINT16 | This value is a percentage (between 0% and 100%) that all six threads are in the wait state (i.e. "All-Waits") during a period of 250 ms. |

As shown, the three items included are the MAX_SLEEP_SCALER for a 205 ms totaling sampling of M=25 predetermined time periods, the raw count data of the M*N array for the M=25 by 10 ms length predetermined time periods (i.e., 250 ms total period), and the All-waits percentage during the same length period of 250 ms. In this example, the display function discussed above may derive the idle count in units of percentage (%), i.e. dividing each individual sleep count with MAX_SLEEP_SCALER, and display the sleep profiling per thread. Nonetheless, in an alternative this percentage calculation may be performed by the multi-thread processor under scrutiny and sent as another field in the data set.

Figure 8:
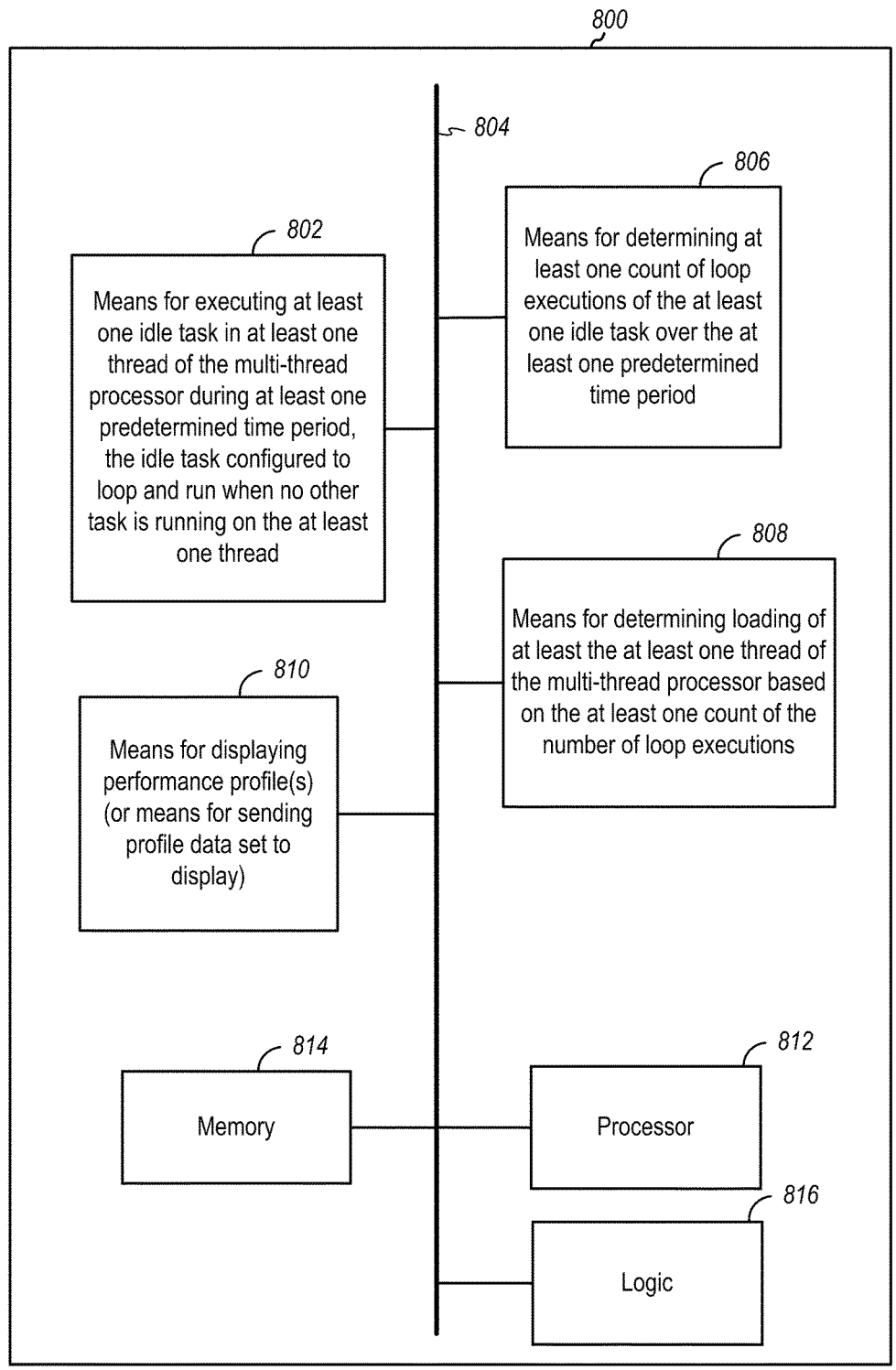
FIG. 8 illustrates a block diagram of another exemplary apparatus for determining a profile of a multi-thread processor.

FIG. 8 illustrates a block diagram of another exemplary apparatus 800 for determining a profile of a multi-thread processor. Apparatus 800 include various modules or means for effecting various functions, such as those functions described above in connection with methods 600 and 700 acting to derive performance profiles of the multi-thread processor. The means or modules of apparatus 800 may be implemented with hardware, software, firmware, or any combination thereof. Furthermore, the multi-thread processor under scrutiny, another processor, a personal computer, dedicated device, or any combination thereof may implement the various modules or means of apparatus 800. Additionally, in one aspect the apparatus 800 may be implemented at least in part within a wireless communication device.

Apparatus 800 includes a means for executing at least one idle task in at least one thread of the multi-thread processor (e.g., processor 302) during at least one predetermined time period, the idle task configured to loop and run when no other task is running on the at least one thread 802. In one example, means 802 may be implemented by processor 302 and, in particular, the OS running of the processor (e.g., OS 402). Apparatus 800 further includes a communication means or communicative coupling represented in FIG. 8 as coupling 804 to merely indicate communication between means or passing of information among the various functions.

Apparatus further includes means 806 for determining at least one count of loop executions of the at least one idle task over the at least one predetermined time period. In one example, means 806 may also be effected by the multi-thread processor (e.g., 302) in conjunction with a means to increment and store a count of the loops of the idle task, such as a register (e.g., register 404 discussed previously). The count information accumulated by means 806 may then be communicated to a means 808 for determining loading of at least the at least one thread of the multi-thread processor based on the at least one count of the number of loop executions. It is noted that means 808 may be implemented with the multi-thread processor, another processor, a personal computer or other computer external to the device containing the multi-thread processor. For example, the raw count data from means 806 may be made part of a data set such as the data set in Table 1, which is in turn sent to an external device for determining the loading.

Furthermore, apparatus 800 may include a means for displaying performance profile(s) 810. Alternatively, means 810 may be configured as a means for sending the performance profile data set to a display (not shown) that is external to apparatus 800. Additionally, the apparatus 800 may alternatively include a processor 812 and a memory 814 that, among other things, may store code executable by a processor (e.g., the multi-thread processor or processor 812) and also store performance profile data. Finally, apparatus 800 may include additional hardware or logic 816 configured to determine data such as the number of CPU cycles the multi-thread processor is idle or waiting, which is the All_Wait_Cycle discussed previously.

One skilled in the art will appreciate that the above-disclosed apparatus and methods afford a dynamic and real-time manner of processor performance profiling without the need for additional equipment or software. Further, the presently disclosed profiling does not cause performance degradation since the profiling is performed, in part, with "idle" tasks. The present apparatus and methods may be instrumental for debugging and system optimization, including power optimization. Moreover, the methods and apparatus may be utilized for design and development of a system using the CPU as a testing tool, or also could be implemented with the CPU in use, such as in a wireless device, to perform profiling that enables ongoing "on-the-fly" optimization of the CPU and/or attendant system.

In a particular aspect, the presently disclosed methods and apparatus provide a dynamic and real-time manner to measure and profile processor performance for wireless devices, although they are not limited only to such devices. The disclosed methods and apparatus may include design and implementation of the "idle" task, design of the "all-wait percentage" function, deriving the maximum sleep or idle count Scalar, collecting and submitting the profiling record data set, and displaying any or all profiling information in a real-time fashion. In summary, the presently disclosed apparatus and methods provide an innovative way to measure multi-thread processor CPU loading under various use cases and data rates, to probe the multi-thread processor CPU usage, per each thread, and to probe the multi-thread processor "all-wait" (i.e. all processor threads are idle) status, when particular task are being performed, such as a packet data session that is ongoing in a wireless device. It is noted that all these provided features do not require wireless standardization or any additional tools.

It is noted that the word "exemplary" is used herein to mean "serving as an example, instance, or illustration." Any embodiment described herein as "exemplary" is not necessarily to be construed as preferred or advantageous over other embodiments.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining loading of a multi-thread computer processor, the method comprising: executing at least one idle task in at least one thread of the multi-thread computer processor during at least one predetermined time period, the one idle task configured to loop and run on when no other task is running on the at least one thread;
    determining at least one count of loop executions of the at least one idle task over the at least one predetermined time period;
    determining loading of at least the at least one thread of the multi-thread computer processor based on the at least one count of the number of loop executions; and
    determining a performance profile for the multi-thread computer processor based on the determined loading of the at least one thread, wherein the performance profile for the multi-thread computer processor is determinable on at least a per thread basis.

2. The method as defined in claim 1, further comprising: displaying the performance profile for each of one or more threads of the multi-thread computer processor.

3. The method as defined in claim 1, wherein determining the at least one count of loop executions of the at least one idle task over the at least one predetermined time period further comprises:
    forming an array of idle task counts including entries for each count for each executed idle task in one or more threads during each predetermined time period over a plurality of predetermined time periods.

4. The method as defined in claim 1, further comprising:
    forcing the multi-thread computer processor into an idle operation where no tasks are executed in the one or more threads;
    executing the at least one idle task in at least one thread; and
    determining a maximum count value for execution of the idle task in the at least one thread over at least one predetermined time period when the multi-thread computer processor is forced into an idle operation.

5. The method as defined in claim 4, further comprising:
    determining the performance profile of the multi-thread computer processor by calculating a ratio of the at least one count of loop executions of the at least one idle task over the at least one predetermined time period to the maximum count value.

6. The method as defined in claim 1, further comprising:
    determining a number of multi-thread computer processor cycles of the processor having all threads idle over a predetermined sampling period;
    determining a total number of multi-thread computer processor cycles occurring during the predetermined sampling period; and
    deriving the performance profile of the multi-thread computer processor based on a ratio of the determined number of multi-thread processor cycles of the processor having all threads idle to the determined total number of multi-thread processor cycles.

7. The method as defined in claim 6, further comprising:
displaying the performance profile for all of one or more threads of the multi-thread computer processor.

8. An apparatus for determining the loading of a multi-thread processor comprising:
at least one computer processor configured to:
execute at least one idle task in at least one thread of the multi-thread processor during at least one predetermined time period, the idle task configured to loop and run when no other task is running on the at least one thread;
determine at least one count of loop executions of the at least one idle task over the at least one predetermined time period;
determine loading of at least the at least one thread of the multi-thread processor based on the at least one count of the number of loop executions; and
determine a performance profile for the multi-thread computer processor based on the determined loading of the at least one thread, wherein the performance profile for the multi-thread computer processor is determinable on at least a per thread basis.

9. The apparatus as defined in claim 8, wherein the at least one computer processor is further configured to display the performance profile for each of one or more threads of the multi-thread processor.

10. The apparatus as defined in claim 8, wherein the at least one computer processor is further configured to determine the at least one count of loop executions of the at least one idle task over the at least one predetermined time period further by forming an array of idle task counts including entries for each count for each executed idle task in one or more threads during each predetermined time period over a plurality of predetermined time periods.

11. The apparatus as defined in claim 8, wherein the at least one computer processor is further configured to force the multi-thread processor into an idle operation where no tasks are executed in the one or more threads; to execute the at least one idle task in at least one thread; and to determine a maximum count value for execution of the idle task in the at least one thread over at least one predetermined time period when the multi-thread processor is forced into an idle operation.

12. The apparatus as defined in claim 11, wherein the at least one computer processor is further configured to determine the performance profile of the multi-thread processor by calculating a ratio of the at least one count of loop executions of the at least one idle task over the at least one predetermined time period to the maximum count value.

13. The apparatus as defined in claim 8, wherein the at least one computer processor is further configured to determine a number of multi-thread processor cycles of the processor having all threads idle over a predetermined sampling period; to determine a total number of multi-thread processor cycles occurring during the predetermined sampling period; and to derive the performance profile of the multi-thread processor based on a ratio of the determined number of multi-thread processor cycles of the processor having all threads idle to the determined total number of multi-thread processor cycles.

14. The apparatus as defined in claim 13, wherein the at least one computer processor is further configured to display the performance profile for all of one or more threads of the multi-thread processor.

15. An apparatus for determining loading of a multi-thread processor comprising:
processing means for executing at least one idle task in at least one thread of the multi-thread processor during at least one predetermined time period, the idle task configured to loop and run when no other task is running on the at least one thread;
processing means for determining at least one count of loop executions of the at least one idle task over the at least one predetermined time period; and
processing means for determining loading of at least the at least one thread of the multi-thread processor based on the at least one count of the number of loop executions; and
processing means for determining a performance profile for the multi-thread computer processor based on the determined loading of the at least one thread, wherein the performance profile for the multi-thread computer processor is determinable on at least a per thread basis.

16. The apparatus as defined in claim 15, further comprising
means for displaying the performance profile for each of one or more threads of the multi-thread processor.

17. The apparatus as defined in claim 15, wherein the processing means for determining the at least one count of loop executions of the at least one idle task over the at least one predetermined time period further comprises:
processing means for forming an array of idle task counts including entries for each count for each executed idle task in one or more threads during each predetermined time period over a plurality of predetermined time periods.

18. The apparatus as defined in claim 15, further comprising:
processing means for forcing the multi-thread processor into an idle operation where no tasks are executed in the one or more threads;
processing means for executing the at least one idle task in at least one thread; and
processing means for determining a maximum count value for execution of the idle task in the at least one thread over at least one predetermined time period when the multi-thread processor is forced into an idle operation.

19. The apparatus as defined in claim 18, further comprising:
processing means for determining the performance profile of the multi-thread processor by calculating a ratio of the at least one count of loop executions of the at least one idle task over the at least one predetermined time period to the maximum count value.

20. The apparatus as defined in claim 15, further comprising:
processing means for determining a number of multi-thread processor cycles of the processor having all threads idle over a predetermined sampling period;
processing means for determining a total number of multi-thread processor cycles occurring during the predetermined sampling period; and
processing means for deriving the performance profile of the multi-thread processor based on a ratio of the determined number of multi-thread processor cycles of the processor having all threads idle to the determined total number of multi-thread processor cycles.

21. The apparatus as defined in claim 20, further comprising:
means for displaying the performance profile for all of one or more threads of the multi-thread processor.

22. A non-transitory computer program product, comprising:
    computer-readable medium comprising:
        code for causing a computer to generate a performance profile of a multi-thread processor including:
            code for causing a computer to execute at least one idle task in at least one thread of the multi-thread processor during at least one predetermined time period, the idle task configured to loop and run when no other task is running on the at least one thread;
            code for causing a computer to determine at least one count of loop executions of the at least one idle task over the at least one predetermined time period;
            code for causing a computer to determine loading of at least the at least one thread of the multi-thread processor based on the at least one count of the number of loop executions; and
            code for causing a computer to determine a performance profile for the multi-thread computer processor based on the determined loading of the at least one thread, wherein the performance profile for the multi-thread computer processor is determinable on at least a per thread basis.

23. The non-transitory computer program product as defined in claim 22, further comprising:
    code for causing a computer to display the performance profile for each of one or more threads of the multi-thread processor.

24. The non-transitory computer program product as defined in claim 22, wherein the code for causing a computer to determine the at least one count of loop executions of the at least one idle task over the at least one predetermined time period further comprises:
    code for causing a computer to form an array of idle task counts including entries for each count for each executed idle task in one or more threads during each predetermined time period over a plurality of predetermined time periods.

25. The non-transitory computer program product as defined in claim 22, further comprising:
    code for causing a computer to force the multi-thread processor into an idle operation where no tasks are executed in the one or more threads;
    code for causing a computer to execute the at least one idle task in at least one thread; and
    code for causing a computer to determine a maximum count value for execution of the idle task in the at least one thread over at least one predetermined time period when the multi-thread processor is forced into an idle operation.

26. The non-transitory computer program product as defined in claim 25, further comprising:
    code for causing a computer to determine the performance profile of the multi-thread processor by calculating a ratio of the at least one count of loop executions of the at least one idle task over the at least one predetermined time period to the maximum count value.

27. The non-transitory computer program product as defined in claim 22, further comprising:
    code for causing a computer to determine a number of multi-thread processor cycles of the processor having all threads idle over a predetermined sampling period;
    code for causing a computer to determine a total number of multi-thread processor cycles occurring during the predetermined sampling period; and
    code for causing a computer to derive the performance profile of the multi-thread processor based on a ratio of the determined number of multi-thread processor cycles of the processor having all threads idle to the determined total number of multi-thread processor cycles.

28. The non-transitory computer program product as defined in claim 27, further comprising:
    code for causing a computer to display the performance profile for all of one or more threads of the multi-thread processor.

* * * * *